United States Patent
Le Bras et al.

(10) Patent No.: US 11,403,539 B2
(45) Date of Patent: Aug. 2, 2022

(54) PATTERN-OPTIMIZED SESSION LOGS FOR IMPROVED WEB ANALYTICS

(71) Applicant: International Business Machines Corporation, Armonk, NY (US)

(72) Inventors: Yves Le Bras, San Francisco, CA (US); Sandip Thube, Pleasanton, CA (US); Swathi Prabhu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 16/021,839

(22) Filed: Jun. 28, 2018

(65) Prior Publication Data

US 2020/0005175 A1    Jan. 2, 2020

(51) Int. Cl.
*G06N 5/04* (2006.01)
*G06F 16/95* (2019.01)
*G06F 16/955* (2019.01)

(52) U.S. Cl.
CPC .......... *G06N 5/047* (2013.01); *G06F 16/955* (2019.01)

(58) Field of Classification Search
CPC .............................. G06N 5/047; G06F 16/955
See application file for complete search history.

(56) References Cited

U.S. PATENT DOCUMENTS

| | | |
|---|---|---|
| 7,152,018 B2 | 12/2006 | Wicks |
| 7,644,134 B2 | 1/2010 | Cohen et al. |
| 10,366,096 B2 * | 7/2019 | Ferrar .................. G06F 16/2455 |
| 2006/0015504 A1 | 1/2006 | Yu et al. |
| 2006/0265406 A1 | 11/2006 | Chkodrov et al. |
| 2008/0086558 A1 * | 4/2008 | Bahadori ................ H04L 67/02 709/224 |
| 2009/0228474 A1 | 9/2009 | Chiu et al. |
| 2010/0121850 A1 | 5/2010 | Moitra et al. |
| 2012/0036256 A1 * | 2/2012 | Shen ..................... H04L 67/025 709/224 |

OTHER PUBLICATIONS

Igor Cadez, "Model-Based Clustering and Visualization of Navigation Patterns on a Web Site", 2003 (Year: 2003).*
P. Kacandes, "Understanding the Customer Journey with User Session Tracking." Application Performance Monitoring Blog. Feb. 23, 2016. [Accessed Dec. 20, 2017] https://blog.appdynamics.com/product/understanding-the-customer-journey-with-user-session-tracking/, 3 pages.

(Continued)

*Primary Examiner* — Ann J Lo
*Assistant Examiner* — Van C Mang
(74) *Attorney, Agent, or Firm* — Schmeiser, Olsen & Watts; Stephanie Carusillo

(57) ABSTRACT

A Web-analytics system analyzes user activity on a Web site of interest. The system receives a set of user-session logs that each track user behavior on the site during one session. The system identifies common patterns of user behavior recorded in the logs. The system stores each identified pattern in a reserved area and replaces each instance of a stored pattern in a log with a placeholder. During the analytics system's subsequent analysis of a session, the system need process only the reduced-size log of that session, referring to the previously stored patterns whenever encountering a corresponding placeholder.

17 Claims, 2 Drawing Sheets

(56) References Cited

OTHER PUBLICATIONS

S. Baron et al., "Monitoring the Evolution of Web Usage Patterns." In: Berendt B., Hotho A., Mladenič D., van Someren M., Spiliopoulou M., Stumme G. (eds) Web Mining: From Web to Semantic Web. Lecture Notes in Computer Science, vol. 3209. Springer, Berlin, Heidelberg, 2004, 16 pages.

IBM Knowledge Center, "Grouping related events into sessions." [Accessed Dec. 20, 2017] https://www.ibm.com/support/knowledgecenter/en/SS42VS_7.3.0/com.ibm.qradar.doc/t_aql_transaction.html, 4 pages.

J. Srivastava et al., 2000. "Web usage mining: discovery and applications of usage patterns from Web data." SIGKDD Explor. Newsl. vol. 1, Issue 2 (Jan. 2000), pp. 12-23.

I. Cadez et al., "Model-Based Clustering and Visualization of Navigation Patterns on a Web Site." Data Mining and Knowledge Discovery, 7, pp. 399-424, 2003.

Anonymous, "System and Methods for Record & Replay of Web-based Mobile Tasks." IP.com Disclosure No. IPCOM000198571D. Publication Date: Aug. 9, 2010, 34 pages.

D. Warner et al., "Mining user session data to facilitate user interaction with a customer service knowledge base in RightNow Web." In Proceedings of the seventh ACM SIGKDD international conference on Knowledge discovery and data mining (KDD '01). ACM, New York, NY, USA, pp. 467-472, 2001.

S. More, "Modified path traversal for an efficient web navigation mining," 2014 IEEE International Conference on Advanced Communications, Control and Computing Technologies, Ramanathapuram, 2014, pp. 940-945, ISBN No. 978-1-4799-39 14-5/14.

\* cited by examiner

PATTERN-OPTIMIZED SESSION LOGS FOR IMPROVED WEB ANALYTICS

BACKGROUND

The present invention relates to Web-analytics technology and in particular to components of a Web-analytics system that analyze Web-session data.

Web analytics is a technology that uses advanced statistical, analytic, or inferential methods to aggregate, analyze, and report information characterizing the behavior of users on a Web site. Analytics technology may be used by Website owners for many different purposes, such as to quantify and optimize site performance, to support business and market research, or to predict user behavior.

Web-analytics technology may be implemented in various forms. For example, a Web-hosting or cloud-computing platform may integrate analytics functionality into a set of internal components, by requesting services from a host computing environment or from a third-party service provider, may making API calls to an underlying platform, or by exchanging data with a distinct third-party application.

Applications of Web-session analytics technology that analyze user sessions conducted on one or more Web sites may capture session data from sources like scripts, applications, and HTTP-request message headers generated by user activities, from IP addresses that identify a user traversing pages of a Web site, or from inferences made by associating extrinsic data with user characteristics and behavior. For example, session data that characterizes a user's behavior and movement through a Web site may be captured from the site's internal log file or from small logical elements called tags that, when embedded a page of the Web site, can report a user's activity on that page.

One drawback of Web-analytics technology is that it can require the processing of an enormous volume of data. Analyzing even a single Web-site user session may require processing a session log that identifies every click or every page visit that the user made during that session. This task can quickly become prohibitively resource-intensive on a high-volume site that serves tens of millions of visitors each day and where a user may view dozens of pages during a single session.

Known Web analytics technologies can thus require enormous processing power, storage capacity, and data bandwidth in order to process real-world session data.

SUMMARY

An embodiment of the present invention is a Web-analytics system comprising a processor, a memory coupled to the processor, and a computer-readable hardware storage device coupled to the processor, the storage device containing program code configured to be run by the processor via the memory to implement a method for pattern-optimized session logs for improved web analytics, the method comprising:

the system receiving a set of session logs of a Web site of interest, where each log of the received session logs records steps performed during a user session of a plurality of user sessions on the Web site;

the system identifying a common sequence of steps that is shared by a subset of the received logs;

the system determining whether the common sequence of steps has been stored as a pattern in a first external storage repository, and if determining that the common sequence of steps has not been stored, storing the common sequence of steps as a pattern in the first external storage repository;

the system replacing, in each log of the subset, the common sequence of steps with a pattern placeholder, where the pattern placeholder identifies a storage location of the pattern in the first external storage repository; and the system further storing each log of the subset in a second external storage repository.

Another embodiment of the present invention is a method for pattern-optimized session logs for improved web analytics comprising:

a processor of a Web-analytics system receiving a set of session logs of a Web site of interest, where each log of the received session logs records steps performed during a user session of a plurality of user sessions on the Web site;

the processor identifying a common sequence of steps that is shared by a subset of the received logs;

the processor determining whether the common sequence of steps has been stored as a pattern in a first external storage repository, and if determining that the common sequence of steps has not been stored, storing the common sequence of steps as a pattern in the first external storage repository;

the processor replacing, in each log of the subset, the common sequence of steps with a pattern placeholder, where the pattern placeholder identifies a storage location of the pattern in the first external storage repository; and the processor further storing each log of the subset in a second external storage repository.

Yet another embodiment of the present invention is a computer program product, comprising a computer-readable hardware storage device having a computer-readable program code stored therein, the program code configured to be executed by a Web-analytics system comprising a processor, a memory coupled to the processor, and a computer-readable hardware storage device coupled to the processor, the storage device containing program code configured to be run by the processor via the memory to implement a method for pattern-optimized session logs for improved web analytics, the method comprising:

a processor of the Web-analytics system receiving a set of session logs of a Web site of interest, where each log of the received session logs records steps performed during a user session of a plurality of user sessions on the Web site;

the processor identifying a common sequence of steps that is shared by a subset of the received logs;

the processor determining whether the common sequence of steps has been stored as a pattern in a first external storage repository, and if determining that the common sequence of steps has not been stored, storing the common sequence of steps as a pattern in the first external storage repository;

the processor replacing, in each log of the subset, the common sequence of steps with a pattern placeholder, where the pattern placeholder identifies a storage location of the pattern in the first external storage repository; and the processor further storing each log of the subset in a second external storage repository.

DETAILED DESCRIPTION

Figure 1:
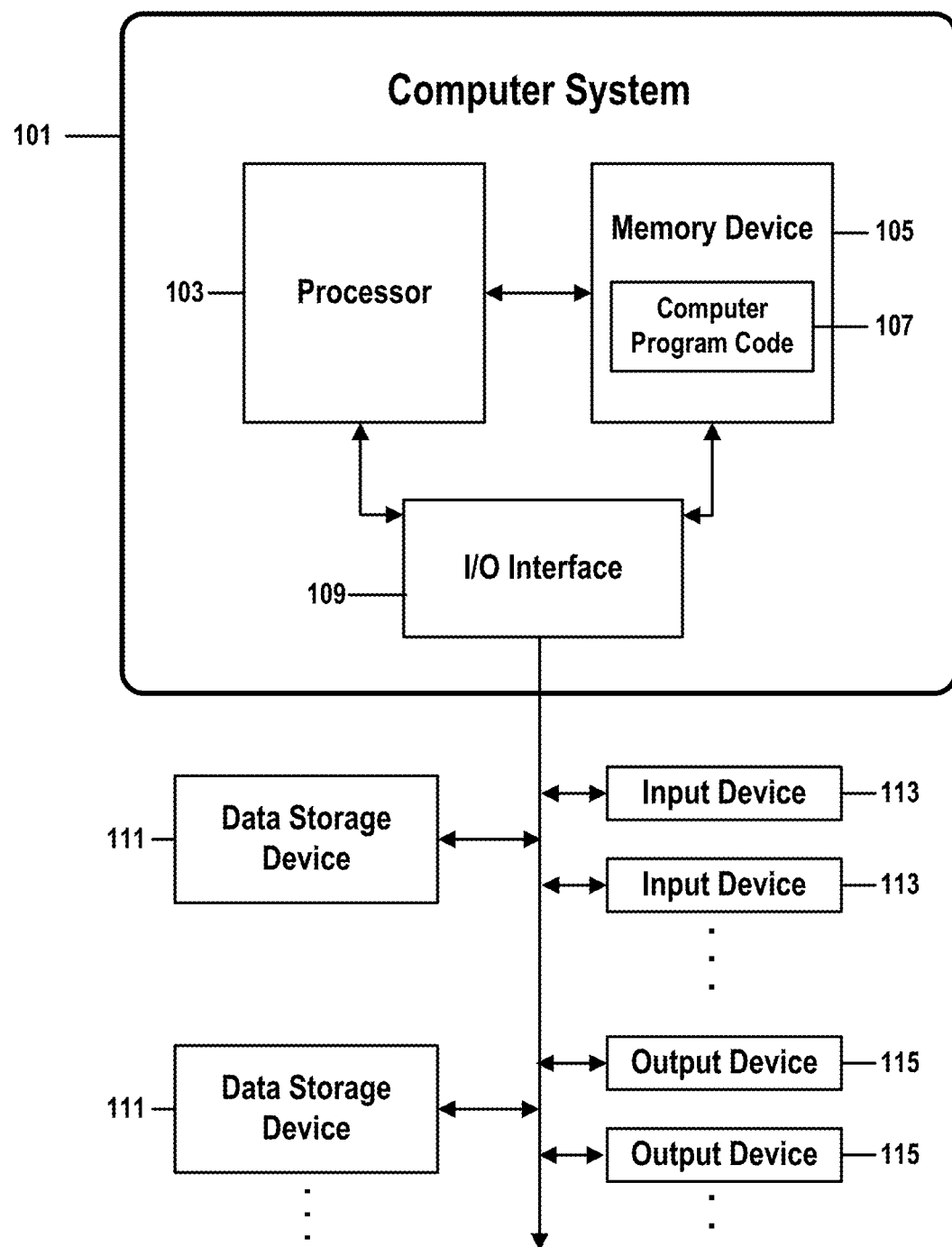
FIG. 1 shows the structure of a computer system and computer program code that may be used to implement a method for pattern-optimized session logs for improved web analytics in accordance with embodiments of the present invention.

Web analytics is rooted in the Web-counter widgets of the 1990s, which tracked the total number of times a Web page was viewed. Today's sophisticated Web-analytics technologies have extended this simple function into advanced feature sets that can track user movements with great granularity and then use advanced cognitive and statistical methods to infer subtle insights about users and the Web sites they traverse.

One branch of Web analytics concerns the processing of distinct user sessions, each of which is described by a body of data that tracks user behavior from the time that a user enters a specific domain (such as a Web site, a social network, or an ecommerce system) through the time that the user leaves that domain.

Web analytics technologies allow an online system to intelligently characterize the activities of users on a Web site and to identify individual and aggregate behavioral patterns that would otherwise be impossible to detect. Analytics technology may be used for purposes like optimizing site performance, determining the effect of a marketing campaign or Web redesign, or identifying ineffective interface elements.

Web-analytics technology may be implemented in various ways, but all implementations require a way to capture and analyze input data that describes user activities on a Web site of interest. Regardless of whether this input data is generated by an internal logging mechanism of the Web site, by tags embedded into individual pages of the Web site, or by an external logging service provided by a third-party service provider or by the Web site's host platform, this session data is likely to be generated in huge quantities at very high speed. Web analytics technology would therefore benefit from a way to reduce this input data to a more manageable volume.

Embodiments of the present invention solve s problem by means of an improvement to known Web-analytics technology that is not currently in use in the field and thus cannot be considered to be well-understood, conventional, or routine.

The present invention accomplishes this task by identifying common patterns in user behavior during Web sessions. When an embodiment determines that a logged description of a Web session comprises activities defined by such a previously identified pattern, the embodiment replaces those activities in the session with a simple pointer. The improved analytics program thus needs to store only one copy of each pattern, rather than thousands or millions of copies, and does not need to perform a redundant analysis upon each instance of that pattern.

By substituting the most common sequences of session data with simple data items, these improvements can greatly reduce the size of the captured session data that a Web-analytics program must process. This substitution also reduces the amount of processing power, time, storage capacity, and related resources necessary to store and analyze session data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for pattern-optimized session logs for improved web analytics in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for pattern-optimized session logs for improved web analytics in accordance with embodiments of the present invention, and may implement other embodiments described in this specification, including the methods illustrated in FIGS. 1-2B. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for pattern-optimized session logs for improved web analytics.

Any of the components of the present invention could be created, integrated, hosted, maintained, deployed, managed, serviced, supported, etc. by a service provider who offers to facilitate a method for pattern-optimized session logs for improved web analytics. Thus the present invention discloses a process for deploying or integrating computing infrastructure, comprising integrating computer-readable code into the computer system 101, wherein the code in combination with the computer system 101 is capable of performing a method for pattern-optimized session logs for improved web analytics.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for pattern-optimized session logs for improved web analytics may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for pattern-optimized session logs for improved web analytics is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2A:
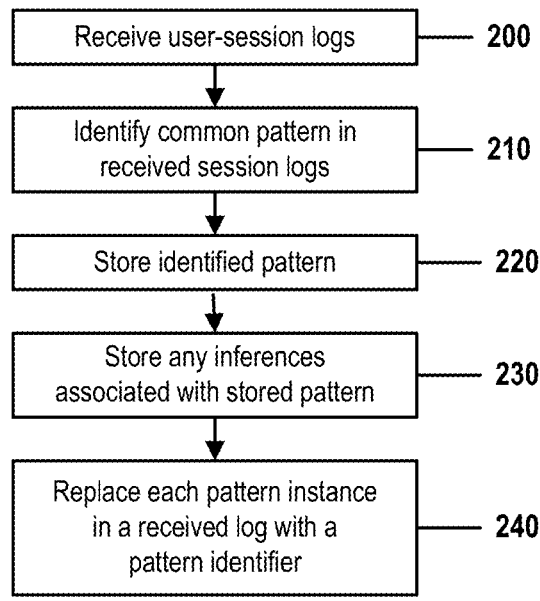
FIG. 2A shows a structure of a computer system and computer program code that may be used to implement a method for optimizing Web-session logs.

FIG. 2A shows a structure of a computer system and computer program code that may be used to implement a method for optimizing Web-session logs. FIG. 2A refers to objects 200-240.

In step 200, a Web-analytics application receives a set of user-session log from a Web site, a mobile application, social network, or another source, through means known in the art. Each received session log may be decomposed into steps that each identify one element of a user's session on the Web site, mobile app, or other source.

For example, if a user displays a Web site's log-in page, logs onto the site, launches the site's search-engine page, views seven product pages on the site, and then logs out from a log-out page, the corresponding log of that session might comprise ten steps that each correspond to one of the ten pages visited by the user during the session.

In another case, a session-logging mechanism that tracks user interactions with greater granularity might have produced a log with more steps. For example, the log may contain additional steps that identify the user's entry of log-in data, the user's entry of search terms into the search engine, the user's addition of two of the displayed products to the user's Wish List, and the method by which the user logged off the site.

Web-analytics applications configured to perform more sophisticated analyses may work with logs that have great granularity, such as a comprehensive record of every click that a user makes. Other implementations, however, may analyze logs consisting of little more than navigation lists that merely enumerate page views. Embodiments of the present invention are flexible enough to accommodate any sort of session log, comprising any sort of individual steps, that are known in the art.

In some embodiments, a logging mechanism may operate continuously or contemporaneously with an embodiment of the present invention. For example, a Web-logging module of the Web-analytics application may continuously log the activities of every user of a Web site, storing each session log in a session-log database as soon as the session is complete. In another example, the analytics application might continuously store each page view, user click, or user data entry in a session-log database as soon as the user views the page, clicks a mouse, or types in data. In these and similar cases, an embodiment of the present invention might continuously retrieve, and process by means of the method of Step 2A, each newly stored session log once the session is closed and the log stored in the database.

In step 210, the Web-analytics application examines a subset of the session logs received in step 200 and identifies one or more common patterns of the steps comprised by these logs.

This identification may be performed by any means known in the art, such as by artificially intelligent or otherwise cognitive inferential methods, by techniques of pattern-matching, by token-based methods similar to those of a finite-state machine, or by statistical analysis.

A common pattern is a particular sequence of steps that is found in multiple session logs. Such a sequence may be deemed to be a "pattern" when the system identifies the sequence in an absolute number of logs, where that number exceeds a threshold value, or in a percent of the total logs evaluated, where that percent exceeds a threshold value. These threshold values may be selected by any means known in the art. For example, an implementer may set an arbitrary percent threshold value whereby any sequence of steps that occurs in more than 1% of the logs that are evaluated is considered to be a pattern. In other cases, a statistical distribution of the rates of recurrence of step sequences may be computed and a sequence of steps may be deemed to be a pattern if the occurrence of that sequence occurs with a frequency that is greater than a certain number of standard deviations from the mean of that distribution.

In another example, an implementer may desire to process a predetermined number patterns. In such cases, if twenty patterns are desired, the twenty sequences of steps that are found in multiple logs are arbitrarily deemed to be patterns.

Once chosen, a predetermined threshold value or other condition may be continually revised in order to refine or optimize the system's operation. For example, if deeming any sequence that occurs in more than 2000 logs to be a pattern results in the identification of only a handful of patterns, an implementer may choose to drop that threshold value to 500 logs in order to increase effectiveness. Some embodiments may require an administrator, engineer, business specialist, or other individual with expert knowledge to manually perform such fine-tuning, but these revisions could also be performed automatically, by means of feedback or cognitive mechanisms, such as by a machine-learning module.

In some embodiments, a sequence of steps may be considered to be a potential pattern if the sequence contains no steps that would be of great significance to a Web-analytics procedure, such as a sequence of steps from which a semantics-analytics or natural-language processing procedure cannot infer meaning that would be relevant to a goal of a particular analytics procedure.

Embodiments of the present invention are flexible enough to accommodate any of these, as well as other known methods, of identifying a sequence of steps as a pattern, as desired by an implementer.

In some embodiments, a pattern may be defined with a certain degree of tolerance, such that two sequences of steps are not identical. For example, if a pattern identifies a sequence that consists of steps required to perform an authentication operation, the pattern might be generalized enough to include both single-step and optional two-step authentication procedures.

If an implementer desires an embodiment to include this degree of flexibility, the guidelines by which the system determines whether two sequences are similar enough to be considered instances of the same pattern may be selected by an implementer. For example, an embodiment may require that at least 90% of all steps a sequence match steps comprised by the pattern, may require that only certain key steps of the sequence match those of the pattern (perhaps, for example, ignoring steps that identify failed log-in attempts or product searches that returned no results), or may allow the order of certain required steps of a sequence to vary.

In other cases, an embodiment may deem that a sequence of steps matches a pattern if the two contain no more than matching sequences of URLs, matching sequences of URLs and associated parameters, or matching user interactions on a specific type of Web page. In yet other embodiments, the system may ignore differences in user-specific data, such as log-in or authentication credentials, a user's personally identifying information (such as a name, billing address, credit-card number, or shipping address), or session-specific or user-specific Document Object Model (DOM) data.

For example, consider a simple pattern that consists of three steps:

Enter credentials "username" and "password" on login page

Enter search term "70-inch television" into search field

Select URL "This year's best 70-inch TVs" from search-results listing

Depending on the intent of an implementer, an embodiment may deem that the pattern matches any session-log sequence in which a user enters login credentials, searches for 70-inch televisions, and selects a result. In other embodiments, however, a match may be found only if a user selects the particular URL identified by the pattern or, conversely, may match any sequence of steps that consist of entering login credentials, searching for any topic, and selecting any search-term result. The present invention is flexible enough to accommodate any such variations that are desired by an implementer as a function of business requirements, technical constraints, or other preferences.

In some cases, an implementer may impose other conditions upon the identification of a candidate pattern. For example, a sequence of steps may be considered to be a candidate pattern only if the sequence includes certain steps that are deemed to be of interest to an implementation. For example, if a goal of the implementation is to analyze user interactions with a revamped search engine, the system may consider only sequences of steps that include a view of the Web site's search page, that include a user's step of entering a search term, or that include a step of selecting a search-term result. This flexibility allows an implementer to tailor the present invention to specific goals of a Web-analytics application.

An embodiment may be tailored in other ways. For example, if the Web site in the previous example offers both original and the revamped versions of its search function, the system may be configured to omit any sequence that includes a step of entering a search term into the original search engine.

Some embodiments may permit the same sequence be identified more than once in the same session log, and may then count that sequence as having occurred multiple times, despite the fact that the multiple instances were comprised by the same log.

For example, consider three captured session logs, each of which records the page views, data entry, and click activity of a user during a distinct session on the Web site.

Session 1/User A
View home page
Click "LOG IN" button
View login page

Enter User ID (john@domain.com)
Enter password
Click "ENTER" button
View home page with user name displayed
Click on product list
Scroll through the product list
End session
Session 2/User B
View home page
Click "LOG IN" button
View login page
Enter User ID (jane@domain.com)
Enter password
Click "ENTER" button
View home page with user name displayed
Click on contact form
View contact form
End session
Session 3/User C
View home page
Click "LOG IN" button
View login page
Enter User ID (joe@domain.com)
Enter password
Click "ENTER" button
View error screen: "INVALID USERNAME/PASSWORD"
View login page
Enter User ID (joe@domain.com)
Enter password
Click "ENTER" button
View home page with user name displayed
Click on "ABOUT THIS SITE" button
View About page
End session In this example, the Web-analytics system in step 200 retrieves these three session logs and in step 210 attempts to determine whether the logs contain common sequences of steps that may be identified as patterns.

The system detects two candidate patterns. Pattern #1 occurs in two of the three logs in exactly the same order, and occurs in the third log with intervening steps. Pattern #2 is a subset of pattern #1 that is comprised by all three session logs. If this exemplary embodiment requires that a pattern identify steps that are comprised by all session logs, and that every instance of the pattern be exactly identical, then only candidate pattern #2 would be considered to be a pattern.

Candidate pattern #1
View home page
Click "LOG IN" button
View login page
Enter User ID
Enter password
Click "ENTER" button
View home page with user name displayed
Candidate pattern #2
View home page
Click "LOG IN" button
View login page
Enter User ID (john@domain.com)
Enter password
Click "ENTER" button Embodiments of the present invention may, before definitively identifying either candidate as a pattern, present and each candidate to an administrator or to a user whose activities are represented by a pattern and request validation of each presented candidate. Here, a validation would confirm the user's or administrator's opinion that the pattern can be used to replace actual session data or that the pattern is functionally equivalent to the session data that it would replace. This optional step may be especially useful in new embodiments that are still being refined, or in embodiments that incorporate machine-learning technology in order to continuously refine performance.

In more advanced embodiments, the system may also allow a user or administrator to replay an entire session, identifying the sequence of steps comprised by the pattern, in order to allow the user or administrator to better determine whether the pattern accurately represents the content of the user session, and whether any context or other desirable information of the session is lost when the sequence is replaced by a pattern.

Some embodiments may also provide an additional advantage to systems that allow a user to visualize or traverse a session history by displaying the session as a series of steps or viewed pages. If a subset of these steps or page views has been identified as a pattern, the system may allow a user to display that entire sequence as a single, compact pattern symbol. This can streamline the visual representation of the session and simplify user navigation. Such streamlining can be especially effective in embodiments in which patterns are more likely to represent less-important sequences of steps.

In step 220, the system stores each identified pattern in a pattern database or other repository. Embodiments of the present invention may comprise any storage mechanism or any storage format known in the art or desired by an implementer. For example, a pattern may be stored as one or more records of a relational database.

In step 230, the system may optionally store one or more inferences associated with the pattern. These inferences may be generated by any means known in the art and, in particular, by known types of analytical rules built into the Web-analytics application.

For example, a pattern may identify steps in which a user searches for a first product, selects a second product from the resulting search results, and then purchases the second product. Using known inferential methods of online analytics, the system might then generate an inference that users who have shown an interest in the first product might react favorably to a suggestion by an ecommerce recommendation engine that the user consider the second product. In step 230, the system would then store this inference along with the pattern, by any means known in the art or desired by an implementer.

In step 240, the system stores an abbreviated version of each session log in a repository. This is performed by means known in the art, such as by storing each log as a series of record of a database or as a set of rows of a flat file.

The system creates each abbreviated log by replacing steps of that log that belong to an identified pattern with a placeholder that references the corresponding pattern. For example, if a session log contains a sequence of steps identical to, or sufficiently similar to, the steps of candidate pattern #2 above, those steps would be excised from the log and replaced with a pointer to a reference copy of candidate pattern #2 that had been stored in step 220.

At the conclusion of step 240, a set of abbreviated session logs will have been created and stored for retrieval by the system in methods described by FIG. 2A. Each stored abbreviated log will have been reduced in size by replacing all instances of identified patterns that had been comprised by the original version of the log received in step 200 with pointers to the copies of the corresponding identified patterns stored in step 220.

Figure 2B:
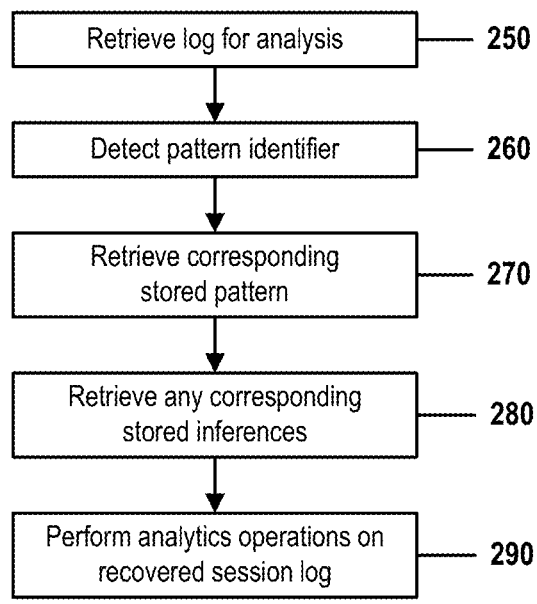
FIG. 2B shows a structure of a computer system and computer program code that may be used to implement a method for performing Web analytics operations upon optimized Web-session logs.

FIG. 2B shows a structure of a computer system and computer program code that may be used to implement a method for performing Web analytics operations upon optimized Web-session logs. FIG. 2B refers to objects 250-290.

In step 250, a processor of a Web-analytics system, during a procedure of performing analytics operations upon a set of session logs of a Web site, retrieves an abbreviated version of a log, where the system had previously created and stored the abbreviated log by means of the method of FIG. 2A. This log is in an abbreviated form because at least one sequence of steps originally comprised by the log have been replaced by a placeholder that points to a previously stored copy of the sequence known as a pattern. Each stored pattern identifies a sequence of steps that had been identified by the method of FIG. 2A as occurring frequently in session logs.

In step 260, the system identifies one or more placeholders that had been embedded into the abbreviated log during step 220 of FIG. 2A. Each of these placeholders identifies a copy of a corresponding pattern stored in an external repository.

In step 270, the system locates and retrieves each externally stored pattern identified by one of the embedded placeholders. The steps identified by each retrieved pattern are inserted into the abbreviated session log in order to recover the original, unabbreviated version of the log, as it was initially received in step 200 of FIG. 2A.

In step 280, the system locates and retrieves any inferences associated with the externally pattern that the system might have stored in an external repository in step 230.

In step 290, the system performs standard Web-analytics procedures on the recovered version of the session log. These standard procedures may include any inferential, artificially intelligent, statistical, or other type of analytic operation known in the art of Web analytics.

In embodiments that include optional steps 230 and 280, the system may include in its analysis any inferences retrieved in step 280.

At the conclusion of this step, the system will have produced results that are very close or identical to those that would have been produced through conventional Web-analytics procedures, but will have done so by analyzing abbreviated versions of some or all session logs, which require less storage capacity and bandwidth to read, store, and transfer.

In some embodiments, the exact order of these steps may vary. For example, it is possible that steps 250-280 may be repeated, performing one iteration for each previously stored abbreviated session log. At the conclusion of the last iteration of the iterative procedure of steps 250-280, all previously stored logs will have been reconstituted and the Web-analytics system will perform its analytics operations upon the entire set of logs, rather than operating upon each log sequentially.

Similarly, in some embodiments, logs will be continuously captured, abbreviated, stored in abbreviated form, retrieved, reconstituted, and analyzed. In such cases, distinct modules of the Web-analytics system will perform these operations in parallel or concurrently. But even in this case, the steps of FIGS. 2A and 2B will be performed for a particular session log in an ordered sequence similar to that described above.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A Web-analytics system comprising a processor, a memory coupled to the processor, and a computer-readable hardware storage device coupled to the processor, the storage device containing program code configured to be run by the processor via the memory to implement a method for pattern-optimized session logs for improved web analytics, the method comprising:

the system receiving a set of session logs of a Web site of interest, where each log of the received session logs records steps performed during a user session of a plurality of user sessions on the Web site;

the system identifying a common sequence of steps that is shared by a subset of the received logs;

the system determining whether the common sequence of steps has been stored as a pattern in a first external storage repository, and if determining that the common sequence of steps has not been stored, storing the common sequence of steps as a pattern in the first external storage repository, where the determining comprises the Web-analytics system attempting to infer a semantic meaning from the common sequence of steps by performing an artificially intelligent semantic-analytics operation, where the sequence is determined to be a pattern if the artificially intelligent semantic-analytics operation cannot infer a semantic meaning from the sequence, and where the semantic-analytics procedure comprises an automated series of natural-language processing, pattern-matching, token-based methods of a finite-state machine, and statistical analysis;

the system storing any semantic meaning inferred by the artificially intelligent semantic-analytics operation in a storage location of a third external storage repository;

the system replacing, in each log of the subset, the common sequence of steps with a pattern placeholder, where the pattern placeholder identifies a storage location of the pattern in the first external storage repository; and the system further storing each log of the subset in a second external storage repository.

2. The system of claim 1, further comprising: the system determining that the common sequence of steps has already been stored as a previous pattern in a previously defined storage location of the first external storage repository; and the system configuring the pattern placeholder to identify the previously defined storage location.

3. The system of claim 1, where the subset comprises a threshold number of logs, and where the threshold number is a predetermined value.

4. The system of claim 1, further comprising: the system presenting the common sequence of steps to a user whose activities were recorded in a first session log of the subset, where the replacing is performed on the first session log only after receiving authorization to proceed, from the user, in response to the presenting.

5. The system of claim 1, further comprising: the system initiating a Web-analytics operation by retrieving the subset of the received logs; the system detecting the placeholder in each log of the subset; the system retrieving the common sequence of steps from the storage location identified by the placeholder; the system replacing the placeholder in each log of the subset with the common sequence of steps; and the system performing the Web-analytics operation upon the subset.

6. The system of claim 1, further comprising: the system initiating a Web-analytics operation by retrieving the subset of the received logs; the system detecting the placeholder in each log of the subset; the system retrieving the common sequence of steps from the storage location identified by the placeholder; the system retrieving the inferred meaning from the associated storage location; the system replacing the placeholder in each log of the subset with the common sequence of steps; and the system performing the Web-analytics operation upon the subset, where the Web-analytics operation comprises consideration of the inferred meaning.

7. A method for pattern-optimized session logs for improved web analytics comprising:
   a processor of a Web-analytics system receiving a set of session logs of a Web site of interest, where each log of the received session logs records steps performed during a user session of a plurality of user sessions on the Web site;
   the processor identifying a common sequence of steps that is shared by a subset of the received logs;
   the system determining whether the common sequence of steps has been stored as a pattern in a first external storage repository, and if determining that the common sequence of steps has not been stored, storing the common sequence of steps as a pattern in the first external storage repository,
      where the determining comprises the Web-analytics system attempting to infer a semantic meaning from the common sequence of steps by performing an artificially intelligent semantic-analytics operation,
      where the sequence is determined to be a pattern if the artificially intelligent semantic-analytics operation cannot infer a semantic meaning from the sequence, and
      where the semantic-analytics procedure comprises an automated series of natural-language processing, pattern-matching, token-based methods of a finite-state machine, and statistical analysis;
   the system storing any semantic meaning inferred by the artificially intelligent semantic-analytics operation in a storage location of a third external storage repository;
   the system replacing, in each log of the subset, the common sequence of steps with a pattern placeholder, where the pattern placeholder identifies a storage location of the pattern in the first external storage repository; and
   the processor further storing each log of the subset in a second external storage repository.

8. The method of claim 7, further comprising: the processor determining that the common sequence of steps has already been stored as a previous pattern in a previously defined storage location of the first external storage repository; and the processor configuring the pattern placeholder to identify the previously defined storage location.

9. The method of claim 7, where the subset comprises a threshold number of logs, and where the threshold number is a predetermined value.

10. The method of claim 7, further comprising: the processor initiating a Web-analytics operation by retrieving the subset of the received logs; the processor detecting the placeholder in each log of the subset; the processor retrieving the common sequence of steps from the storage location identified by the placeholder; the processor replacing the placeholder in each log of the subset with the common sequence of steps; and the processor performing the Web-analytics operation upon the subset.

11. The method of claim 7, further comprising: the processor initiating a Web-analytics operation by retrieving the subset of the received logs; the processor detecting the placeholder in each log of the subset; the processor retrieving the common sequence of steps from the storage location identified by the placeholder; the processor retrieving the inferred meaning from the associated storage location; the processor replacing the placeholder in each log of the subset with the common sequence of steps; and the processor performing the Web-analytics operation upon the subset, where the Web-analytics operation comprises consideration of the inferred meaning.

12. The method of claim 7, further comprising providing at least one support service for at least one of creating, integrating, hosting, maintaining, and deploying computer-readable program code in the computer system, wherein the computer-readable program code in combination with the computer system is configured to implement the receiving, the identifying, the determining, the storing, the replacing, and the further storing.

13. A computer program product, comprising a computer-readable hardware storage device having a computer-readable program code stored therein, the program code configured to be executed by a Web-analytics system comprising a processor, a memory coupled to the processor, and a computer-readable hardware storage device coupled to the processor, the storage device containing program code configured to be run by the processor via the memory to implement a method for pattern-optimized session logs for improved web analytics, the method comprising:
   a processor of the Web-analytics system receiving a set of session logs of a Web site of interest, where each log of the received session logs records steps performed during a user session of a plurality of user sessions on the Web site;
   the processor identifying a common sequence of steps that is shared by a subset of the received logs;
   the system determining whether the common sequence of steps has been stored as a pattern in a first external storage repository, and if determining that the common sequence of steps has not been stored, storing the common sequence of steps as a pattern in the first external storage repository,
      where the determining comprises the Web-analytics system attempting to infer a semantic meaning from the common sequence of steps by performing an artificially intelligent semantic-analytics operation,
      where the sequence is determined to be a pattern if the artificially intelligent semantic-analytics operation cannot infer a semantic meaning from the sequence, and
      where the semantic-analytics procedure comprises an automated series of natural-language processing, pattern-matching, token-based methods of a finite-state machine, and statistical analysis;

the system storing any semantic meaning inferred by the artificially intelligent semantic-analytics operation in a storage location of a third external storage repository;

the system replacing, in each log of the subset, the common sequence of steps with a pattern placeholder, where the pattern placeholder identifies a storage location of the pattern in the first external storage repository; and the processor further storing each log of the subset in a second external storage repository.

14. The computer program product of claim 13, further comprising: the processor determining that the common sequence of steps has already been stored as a previous pattern in a previously defined storage location of the first external storage repository; and the processor configuring the pattern placeholder to identify the previously defined storage location.

15. The computer program product of claim 13, where the subset comprises a threshold number of logs, and where the threshold number is a predetermined value deemed to identify a lowest acceptable number of logs.

16. The computer program product of claim 13, further comprising: the processor initiating a Web-analytics operation by retrieving the subset of the received logs; the processor detecting the placeholder in each log of the subset; the processor retrieving the common sequence of steps from the storage location identified by the placeholder; the processor replacing the placeholder in each log of the subset with the common sequence of steps; and the processor performing the Web-analytics operation upon the subset.

17. The computer program product of claim 1, further comprising: the processor initiating a Web-analytics operation by retrieving the subset of the received logs; the processor detecting the placeholder in each log of the subset; the processor retrieving the common sequence of steps from the storage location identified by the placeholder; the processor retrieving the inferred meaning from the associated storage location; the processor replacing the placeholder in each log of the subset with the common sequence of steps; and the processor performing the Web-analytics operation upon the subset, where the Web-analytics operation comprises consideration of the inferred meaning.

* * * * *